(12) United States Patent
Yasui et al.

(10) Patent No.: US 11,823,230 B2
(45) Date of Patent: Nov. 21, 2023

(54) CONTROL APPARATUS, SYSTEM, COMPUTER-READABLE STORAGE MEDIUM, AND CONTROL METHOD

(71) Applicant: HONDA MOTOR CO., LTD., Tokyo (JP)

(72) Inventors: Yuji Yasui, Saitama (JP); Yo Ito, Tokyo (JP); Toshikatsu Kuramochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 17/185,974

(22) Filed: Feb. 26, 2021

(65) Prior Publication Data
US 2021/0287253 A1   Sep. 16, 2021

(30) Foreign Application Priority Data
Mar. 16, 2020   (JP) .................................. 2020-045675

(51) Int. Cl.
*G06Q 30/02*   (2023.01)
*G06Q 30/0251*   (2023.01)
(Continued)

(52) U.S. Cl.
CPC ..... *G06Q 30/0266* (2013.01); *B60W 60/0053* (2020.02); *B60W 60/0059* (2020.02); *G01C 21/3461* (2013.01); *G01C 21/3605* (2013.01)

(58) Field of Classification Search
CPC ...... G06Q 30/0207–30/0277; B60W 60/0059; B60W 60/0053; G01C 21/3461; G01C 21/3605
(Continued)

(56) References Cited

U.S. PATENT DOCUMENTS

2012/0083964 A1* 4/2012 Montemerlo ...... G07C 9/00563
701/25
2017/0318433 A1* 11/2017 Kitagishi ................ H04W 4/23
(Continued)

FOREIGN PATENT DOCUMENTS

JP      2007-250010 A  *  9/2007   ............. G06Q 30/02
JP      2010002759 A       1/2010
(Continued)

OTHER PUBLICATIONS

Office Action issued for counterpart Japanese Application No. 2020-045675, issued by the Japanese Patent Office dated Aug. 22, 2023 (drafted on Aug. 17, 2023).

*Primary Examiner* — David J Stoltenberg

(57) ABSTRACT

A control apparatus is configured to control advertisement data presented to an occupant of a movable object having an automated driving function, and includes a travel road specification unit for specifying a road scheduled to be travelled by the movable object corresponding to the destination, a setting unit for setting, according to the road scheduled to be travelled, a switching recommendation point for switching a driving mode of the movable object from automated drive to driver-led manual drive, a notification plan generation unit for setting a degree of importance of the advertisement data to be presented according to the driving mode for the road scheduled to be travelled, and generating a notification plan for presenting the advertisement data to the occupant according to the set degree of importance, and a notification control unit for presenting notification data including the advertisement data to the occupant according to the notification plan.

20 Claims, 14 Drawing Sheets

(51) Int. Cl.
  *B60W 60/00*   (2020.01)
  *G01C 21/36*   (2006.01)
  *G01C 21/34*   (2006.01)

(58) Field of Classification Search
  USPC .................................................. 705/14, 319
  See application file for complete search history.

(56)                    References Cited

U.S. PATENT DOCUMENTS

| | | | |
|---|---|---|---|
| 2018/0270633 A1* | 9/2018 | Yamashiro | .............. H04M 11/00 |
| 2018/0364060 A1* | 12/2018 | Katsuki | .............. G01C 21/3492 |
| 2019/0370862 A1* | 12/2019 | Seo | .......... G09F 25/00 |
| 2020/0065041 A1 | 2/2020 | Ichikawa | |
| 2021/0129868 A1* | 5/2021 | Nehmadi | ................ G01C 21/26 |
| 2021/0360626 A1* | 11/2021 | Gong | .................... H04W 72/21 |
| 2021/0362727 A1* | 11/2021 | Kim | ....................... G06Q 50/30 |

FOREIGN PATENT DOCUMENTS

| | | | |
|---|---|---|---|
| JP | 2011150462 A | 8/2011 | |
| JP | 2016065938 A | 4/2016 | |
| JP | 2020030361 A | 2/2020 | |

\* cited by examiner

| USER | BEHAVIOR INFORMATION ||
|---|---|---|
| | PERSONAL RELEVANT ADVERTISEMENT | POINT RELEVANT ADVERTISEMENT |
| U001 | 2 | 5 |
| U002 | 2 | 0 |
| ⋮ | ⋮ | ⋮ |

*FIG. 11*

| TYPE | ASSOCIATION DEGREE OF AUTOMATED DRIVING LEVEL | | | | | |
|---|---|---|---|---|---|---|
| | 5 | 4 | 3 | 2 | 1 | 0 |
| ROAD A | 10 | 10 | 10 | 10 | 10 | 10 |
| ROAD B | 10 | 10 | 10 | 10 | 10 | 10 |
| ROAD C | 10 | 10 | 10 | 10 | 10 | 10 |
| ADVERTISE-MENT A | 6 | 6 | 6 | 2 | 2 | 2 |
| ADVERTISE-MENT B | 4 | 4 | 4 | 4 | 4 | 2 |
| ADVERTISE-MENT C | 2 | 2 | 2 | 0 | 0 | 0 |
| NEWS A | 6 | 6 | 6 | 6 | 6 | 6 |
| NEWS B | 4 | 4 | 4 | 1 | 1 | 0 |
| NEWS C | 2 | 2 | 2 | 0 | 0 | 0 |
| SMALL TALK | 1 | 1 | 1 | 0 | 0 | 0 |

CONTROL APPARATUS, SYSTEM, COMPUTER-READABLE STORAGE MEDIUM, AND CONTROL METHOD

CROSS REFERENCE TO RELATED APPLICATION

The contents of the following Japanese patent application are incorporated herein by reference, Japanese Patent Application No. 2020-045675 filed in JP on Mar. 16, 2020.

BACKGROUND

1. Technical Field

The present invention relates to a control apparatus, a system, a computer-readable storage medium, and a control method.

2. Related Art

Patent document 1 describes "including drive assist means for performing drive assist for a driver, and changing contents of the drive assist by the drive assist means in association with a display state of advertisement information by the advertisement display means". Patent document 2 describes "an advertisement corresponding to a surrounding environment of a host vehicle 100 is downloaded from a server 45 to a host vehicle 100 and displayed on a display 31", and "advertisement information includes an advertisement fee according to a route".

CITATION LIST

[Patent Document]
[Patent document 1] Japanese Unexamined Patent Application Publication No. 2010-2759
[Patent document 2] Japanese Unexamined Patent Application Publication No. 2016-65938

BRIEF DESCRIPTION OF THE DRAWINGS

FIG. 11 illustrates a data structure of an occupant behavior information for evaluating a movement of an occupant 80.

FIG. 12 illustrates one example of association degree information between notification data and an automated driving level.

DESCRIPTION OF EXEMPLARY EMBODIMENTS

Hereinafter, the present invention will be described by way of exemplary embodiments of the invention, but the following embodiments are not intended to restrict the invention according to the claims. In addition, not all combinations of features described in the embodiments necessarily have to be essential to solving means of the invention.

Figure 1:
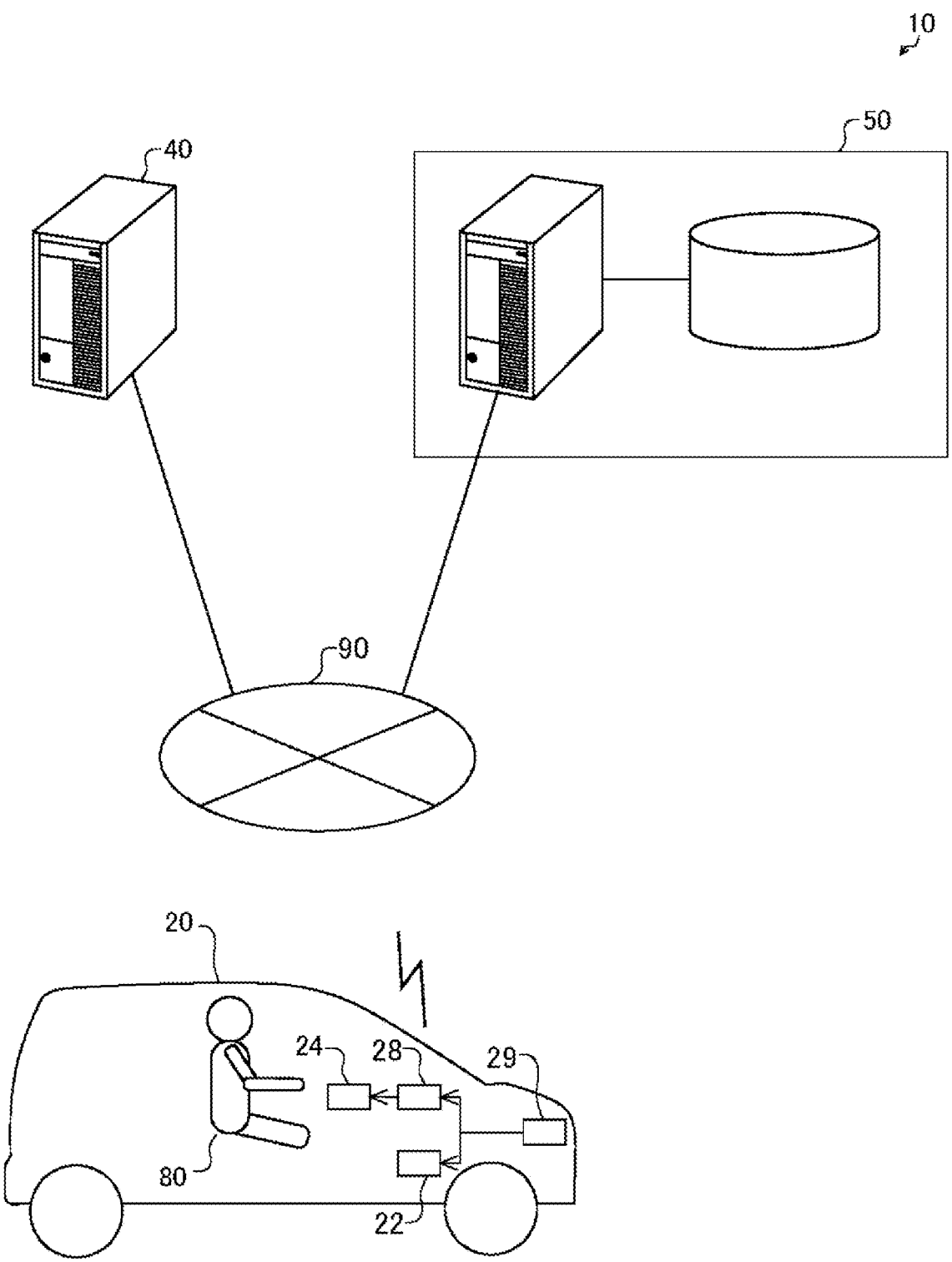
FIG. 1 schematically illustrates a configuration of a system 10.

FIG. 1 schematically illustrates a configuration of a system 10. The system 10 is provided with a movable object 20, a notification server 40, and a content server 50. The system 10 is a system configured to provide the movable object 20 with notification data.

The movable object 20, the notification server 40, and the content server 50 are connected to a network 90. The network 90 includes a communication line such as the Internet or a mobile communication network. The notification server 40 communicates with the content server 50 and the movable object 20 through the network 90.

The content server 50 obtains and stores, in a database, video data and text data provided by video distribution services on the network 90, text data and image data such as still image data and video data included in posted information on social network services (SNS), and image data and text data included in web pages and the like. In addition, the content server 50 obtains and stores, in the database, audio data, text data, and image data distributed through television broadcast and radio broadcast. The content server 50 obtains and stores, in the database, advertisement data from an advertisement distribution company. In addition, the content server 50 obtains and stores, in the database, news information from news providing company. The content server 50 sends content data to the notification server 40 according to a request from the notification server 40.

The content data may include, for example, time instant information, location information, and phenomenon information. The time instant information indicates a time instant associated with the phenomenon information. The location information indicates a location associated with the phenomenon information. The phenomenon information includes weather information, accident information, event information, roadwork information, traffic jam information, advertisement information, news information, and the like.

The movable object 20 has an automated driving function. The movable object 20 is provided with an automated drive control apparatus 22, a notification apparatus 24, a communication apparatus 28, and a sensor 29. The sensor 29 is provided with a radar, a camera, a positioning apparatus, a speed sensor, and the like. The automated drive control apparatus 22 is configured to provide the movable object 20 with the automated driving function. For example, the automated drive control apparatus 22 controls steering or acceleration and deceleration of the movable object 20 in an automated manner. The automated drive control apparatus 22 uses information obtained by the sensor 29 to control the steering or the acceleration and deceleration of the movable object 20 in an automated manner. The automated driving function by the automated drive control apparatus 22 may be an automated driving function for controlling the steering and the acceleration and deceleration in a mode in which an intervention degree to the driving by the system is increased. In this case, since an intervention degree to the driving by an occupant of the movable object 20 is relatively decreased, an attention degree of the occupant to a notification tends to be increased, which is preferable to provision of notification data. The automated drive control apparatus 22 may have a function of advanced driver-assistance systems (ADAS). The automated drive control apparatus 22 is implemented, for example, by an electronic control unit (ECU) provided with a microcomputer. The communication apparatus 28 communicates with the notification server 40 through the network 90. The communication apparatus 28 is configured to send destination information of the movable object 20 to the notification server 40. In addition, the communication apparatus 28 sends location information of the movable object 20, speed information of the movable object 20, control information related to the automated driving function of the movable object 20, image information of a surrounding of the movable object 20, and information related to the occupant 80 of the movable object 20 which are obtained by the sensor 29, and the like to the notification server 40. The communication apparatus 28 may be configured by including a telematics control unit (TCU). The occupant 80 may be a driver of the movable object 20.

The notification server 40 is configured to generate notification data based on information collected from a plurality of movable objects including the movable object 20 and information received from the content server 50. For example, based on a destination of the movable object 20, the notification server 40 specifies a route scheduled to be travelled to the destination. The notification server 40 decides automated driving levels of the movable object 20 in a plurality of sections in the route scheduled to be travelled based on road information of the route scheduled to be travelled. Note that automated driving levels of SAE J3016 may be applied as the automated driving levels, for example. In this case, an automated driving level 0 to an automated driving level 2 may correspond to a driver-led manual driving mode, and an automated driving level 3 to an automated driving level 5 may correspond to an automated driving mode led by the automated drive control apparatus 22.

In addition, the notification server 40 sets a passing point on the route scheduled to be travelled by the movable object 20. The notification server 40 obtains, from the content server 50, contents serving as a base of notification data provided to the occupant 80 based on information on a point where the automated driving level is switched and the passing point, occupant information obtained from the movable object 20, and the like, and generates the notification data. For example, the notification server 40 obtains content data which is associated with a switching point of the automated driving level of the movable object 20 and also associated with a time instant at which the movable object 20 passes the switching point, and generates a notification plan for setting timing of the notification data to be sent to the movable object 20. For example, the notification server 40 decides timing for presenting the notification data for switching the automated driving level. In addition, the notification server 40 decides a time instant and a duration for presenting the notification data. According to travelling of the movable object 20, the notification server 40 generates the notification data in accordance with the travel plan, and sends the notification data to the movable object 20.

In the movable object 20, when the communication apparatus 28 receives the notification data from the notification server 40, the notification apparatus 24 presents the notification data received by the communication apparatus 28 to the occupant 80. For example, the notification apparatus 24 has a human machine interface (HMI) function, and the notification apparatus 24 is configured to present the notification data in a form of audio information and image information. According to the system 10, the notification data related to the point where the movable object 20 travels and the switching of the automated driving level of the movable object 20 can be presented to the occupant 80 at an appropriate timing.

Figure 2:
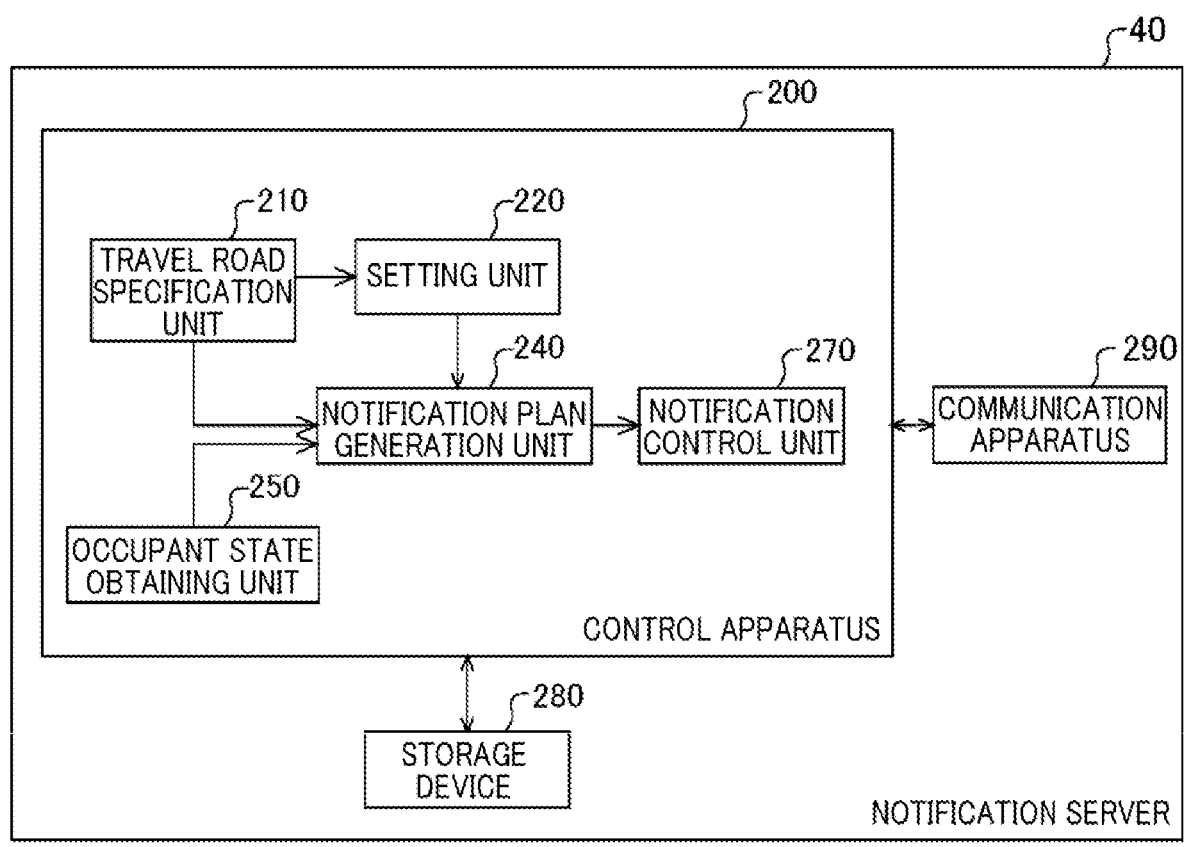
FIG. 2 illustrates a system configuration of a notification server 40.

FIG. 2 illustrates a system configuration of the notification server 40. The notification server 40 is provided with a control apparatus 200, a storage device 280, and a communication apparatus 290. The control apparatus 200 is implemented, for example, by being provided with an arithmetic processing unit including a processor. The storage device 280 is implemented by being provided with a non-volatile storage medium. The control apparatus 200 is configured to perform processing using information stored in the storage device 280. The communication apparatus 290 plays a role to communicate with the movable object 20 and the content server 50.

The control apparatus 200 controls notification data presented to the occupant 80. The control apparatus 200 is provided with a travel road specification unit 210, a setting unit 220, a notification plan generation unit 240, an occupant state obtaining unit 250, and a notification control unit 270.

The travel road specification unit 210 is configured to specify a road scheduled to be travelled by the movable object 20 corresponding to the destination set for the movable object 20. Note that the travel road specification unit 210 may obtain information on the road scheduled to be travelled which is decided by a car navigation system included in the movable object 20.

The setting unit 220 is configured to set, according to the road scheduled to be travelled, a switching recommendation point for switching a driving mode of the movable object 20 from automated drive to driver-led manual drive on the road scheduled to be travelled. The notification plan generation unit 240 is configured to set a degree of importance of advertisement data that is to be presented according to the driving mode on the road scheduled to be travelled, and generate a notification plan for presenting the advertisement data to the occupant 80 according to the set degree of importance. The notification control unit 270 is configured to cause the notification data including the advertisement data to be presented to the occupant 80 in accordance with the notification plan generated by the notification plan generation unit 240. Specifically, the notification control unit 270 causes the notification data from the notification apparatus 24 to be presented by sending the notification data to the movable object 20 via the communication apparatus 290.

The setting unit 220 sets a scheduled passing time instant at which the switching recommendation point is passed. The notification plan generation unit 240 generates the notification plan for presenting the notification data including the advertisement data to the occupant 80 according to the switching recommendation point and the scheduled passing time instant.

The automated driving function has a plurality of automated driving modes according to an operation amount of the automated drive control apparatus 22 included in the movable object 20. The operation amount of the automated drive control apparatus 22 is determined according to an automated driving level. The notification plan generation unit 240 sets a higher importance for a higher operation amount of the automated drive control apparatus 22 in the automated driving mode.

The travel road specification unit 210 sets a passing point on the road scheduled to be travelled corresponding to information of the occupant 80 or a road condition, and sets the degree of importance higher in a range up to a location ahead of the passing point by a predetermined distance or up to a location ahead of the destination by a predetermined distance.

The notification plan generation unit 240 obtains a behavior of the occupant 80 in a case where the advertisement data based on the information of the occupant 80 is presented and a behavior of the occupant 80 in a case where the advertisement data based on the passing point or the destination is presented, and sets the degree of importance for each of the occupants 80 using the notification contents and behavior results as learning data.

The occupant state obtaining unit 250 is configured to obtain a state of the occupant 80 of the movable object 20. The occupant state obtaining unit 250 may obtain the state of the occupant 80 of the movable object 20 by receiving the information collected by the sensor 29 in the movable object 20. The information collected by the occupant state obtaining unit 250 may be face information of the occupant 80. The information collected by the occupant state obtaining unit 250 may include location information of the movable object 20. The notification plan generation unit 240 may obtain the behavior of the occupant 80 based on the state of the occupant 80 which is obtained by the occupant state obtaining unit 250.

The automated driving function has a plurality of automated driving modes according to the operation amount of the automated drive control apparatus 22 included in the movable object 20. The notification plan is configured by including the notification data and a plurality of management units in which the notification data is set. A notification time and at least any driving mode of a corresponding automated driving mode and manual driving mode are set in the notification data. The plurality of management units corresponding to the switching recommendation point for switching the driving mode and the scheduled passing time instant at which the switching recommendation point is passed are set in time units. The notification plan generation unit 240 sets the notification data in the management unit according to a time of the management unit. The notification plan generation unit 240 sets the degree of importance according to timing at which the advertisement data is presented in the management unit.

The setting unit 220 sets the automated driving mode scheduled for each road scheduled to be travelled. The notification plan generation unit 240 sets the notification data permitted according to the automated driving mode set for the road scheduled to be travelled in the management unit.

The degree of importance may reflect on a price related to notification of the advertisement data. For example, the degree of importance may be used for charging a distribution company that distributes the advertisement data.

Figure 3:
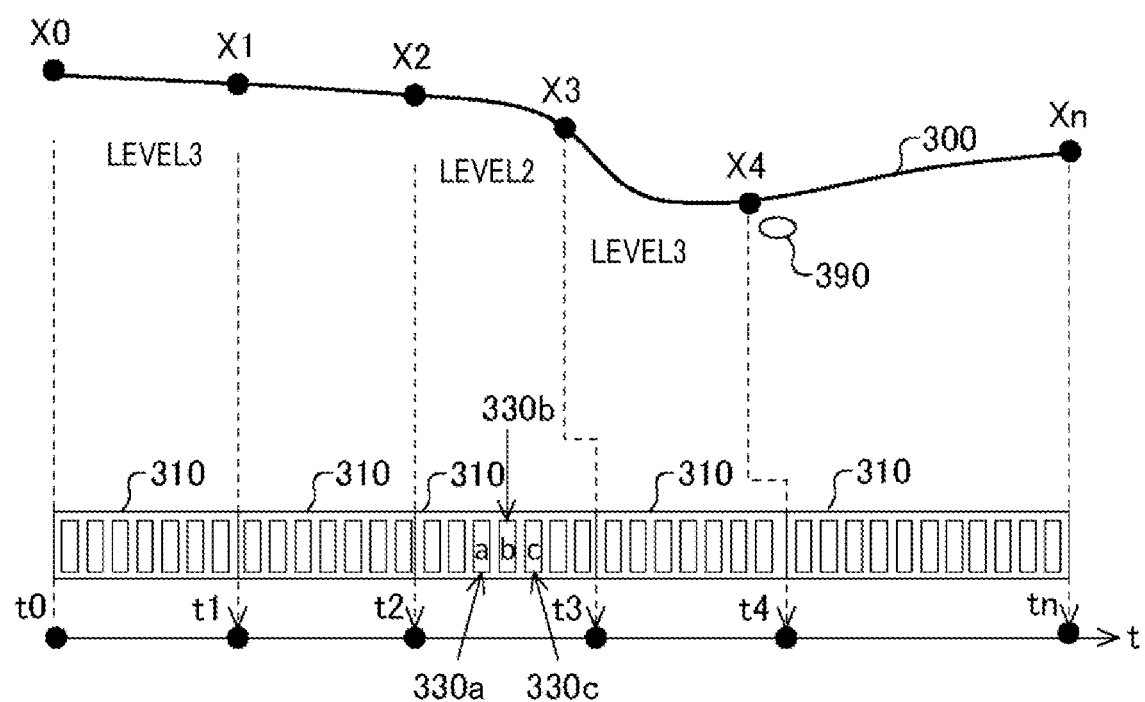
FIG. 3 is a diagram for describing a unit of management (management unit) in which notification data is set.

FIG. 3 is a diagram for describing the management unit in which notification data is set. A point X0 is a point of departure of the movable object 20. A point Xn is a destination of the movable object 20. A road scheduled to be travelled 300 is a road where the movable object 20 is scheduled to travel. The road scheduled to be travelled 300 is decided by the travel road specification unit 210.

The setting unit 220 sets a plurality of points including points X1 to X4 on the road scheduled to be travelled 300. For example, in a case where the setting unit 220 decides that the movable object 20 travels on a road from the point X0 to the point X2 at the automated driving level 3, the movable object 20 travels from the point X2 to the point X3 at the automated driving level 2, and the movable object 20 travels from the point X3 to the point X4 at the automated driving level 3, the setting unit 220 sets X2 and X3 as the switching recommendation points for switching the automated driving level.

In addition, in a case where a distance between the point X0 and the point X2 exceeds a predetermined distance, the setting unit 220 sets the point X1 between the point X0 and the point X2. For example, the setting unit 220 may decide the point X1 according to a travel time of the movable object 20. For example, the setting unit 220 may decide a point where the movable object 20 has travelled for approximately 1 hour from the point X0 as X1. In addition, the setting unit 220 sets, on the road scheduled to be travelled 300, the point X4 near a point where a specific spot 390 such as a tourist attraction or a facility exists.

The notification plan generation unit 240 sets one management unit 310 in each of a plurality of periods separated by time instants corresponding to the points set by the setting unit 220. The notification plan generation unit 240 sets a plurality of pieces of notification data 330 in each of the management units 310. As one example, the notification plan generation unit 240 sets notification data 330c for notifying the occupant 80 of the switching of the automated driving level in a management unit ahead of timing corresponding to the switching recommendation point X2. In addition, the notification plan generation unit 240 sets notification data 330b serving as advertisement data and notification data 330a serving as news data before the notification data 330c. The notification plan generation unit 240 selects the advertisement data and the news data to be set as the notification data 330 in the management unit based on interest information of the occupant 80 and a point where the movable object 20 exists at a notification timing. In this manner, the notification plan generation unit 240 generates the notification plan in advance based on the switching recommendation point of the automated driving level, and the notification control unit 270 causes transmission of the notification data to the movable object 20 in accordance with the notification plan generated by the notification plan generation unit 240.

Figure 4:
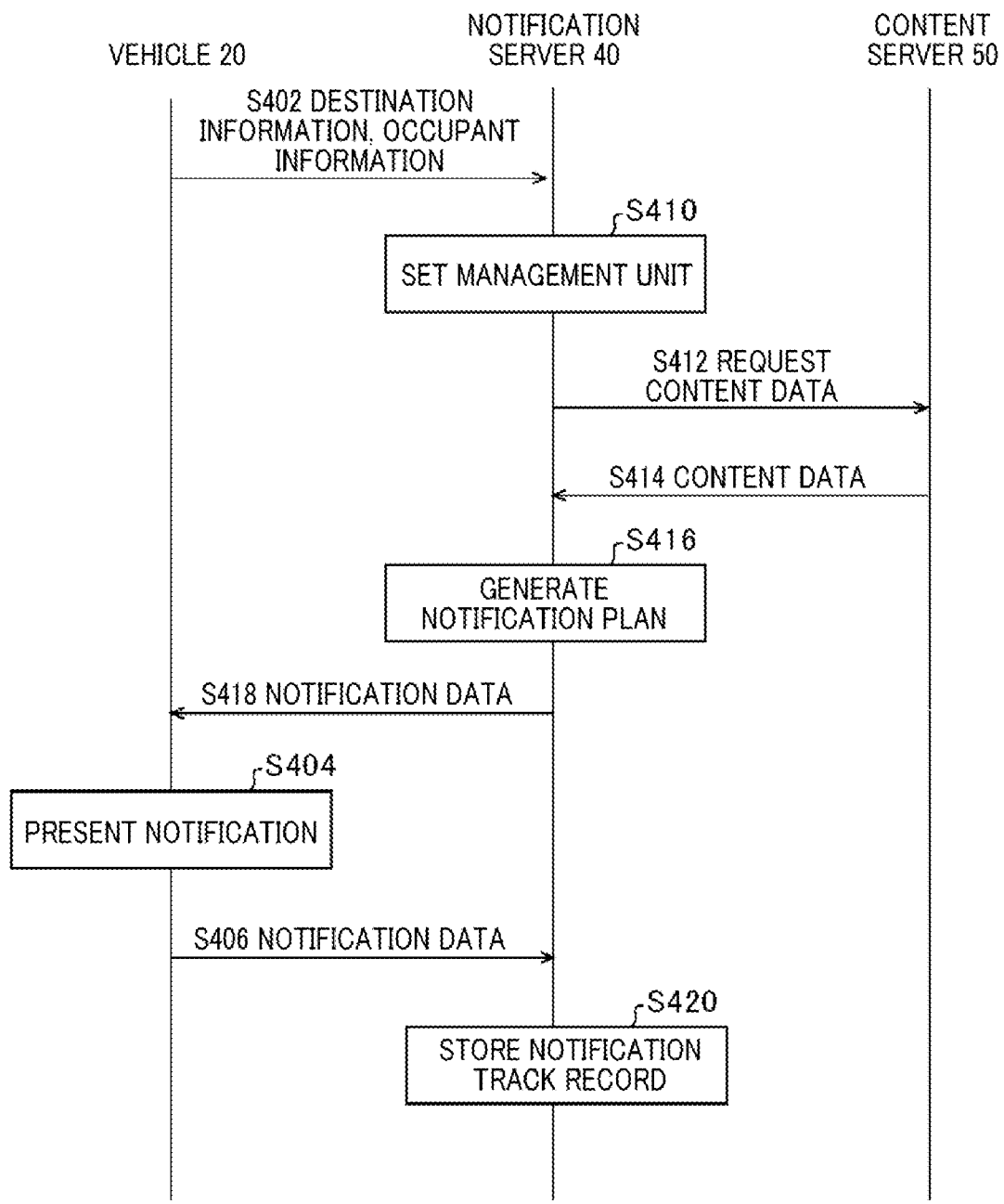
FIG. 4 illustrates a flow of data among a movable object 20, the notification server 40, and a content server 50.

FIG. 4 illustrates a flow of data among the movable object 20, the notification server 40, and the content server 50. In S402, the communication apparatus 28 sends the destination information set by the occupant 80 and information of the occupant 80 to the notification server 40. The information of the occupant 80 may include identification information of the occupant 80, interest information of the occupant 80, or the like. In S410, the notification plan generation unit 240 sets the management unit. Specifically, the travel road specification unit 210 sets the road scheduled to be travelled based on the destination and the road information, the setting unit 220 sets the automated driving levels of the movable object 20, the switching recommendation points X, and time instants when the movable object 20 passes the points X at the respective spots, and the notification plan generation unit 240 sets the management unit.

In S412, the communication apparatus 290 is configured to send request information for content data associated with the point on the road scheduled to be travelled to the content server 50. In S414, the communication apparatus 290 receives the content data from the content server 50. In S416, the notification plan generation unit 240 generates notification data based on the content data, and assigns the notification data into the management unit. In S418, the communication apparatus 290 sends the notification data to the movable object 20. In S404, the notification apparatus 24 presents notification to the occupant 80 in accordance with the received notification data. In a case where the notification data is advertisement data, after the notification apparatus 24 presents the notification, in S406, the communication apparatus 28 sends, to the notification server 40, information indicating that the notification data has been presented. In S420, the notification server 40 stores notification track record information indicating the completion of the notification in the storage device 280. The notification server 40 charges a business operator who has provided the content data based on the notification track record information.

Figure 5:
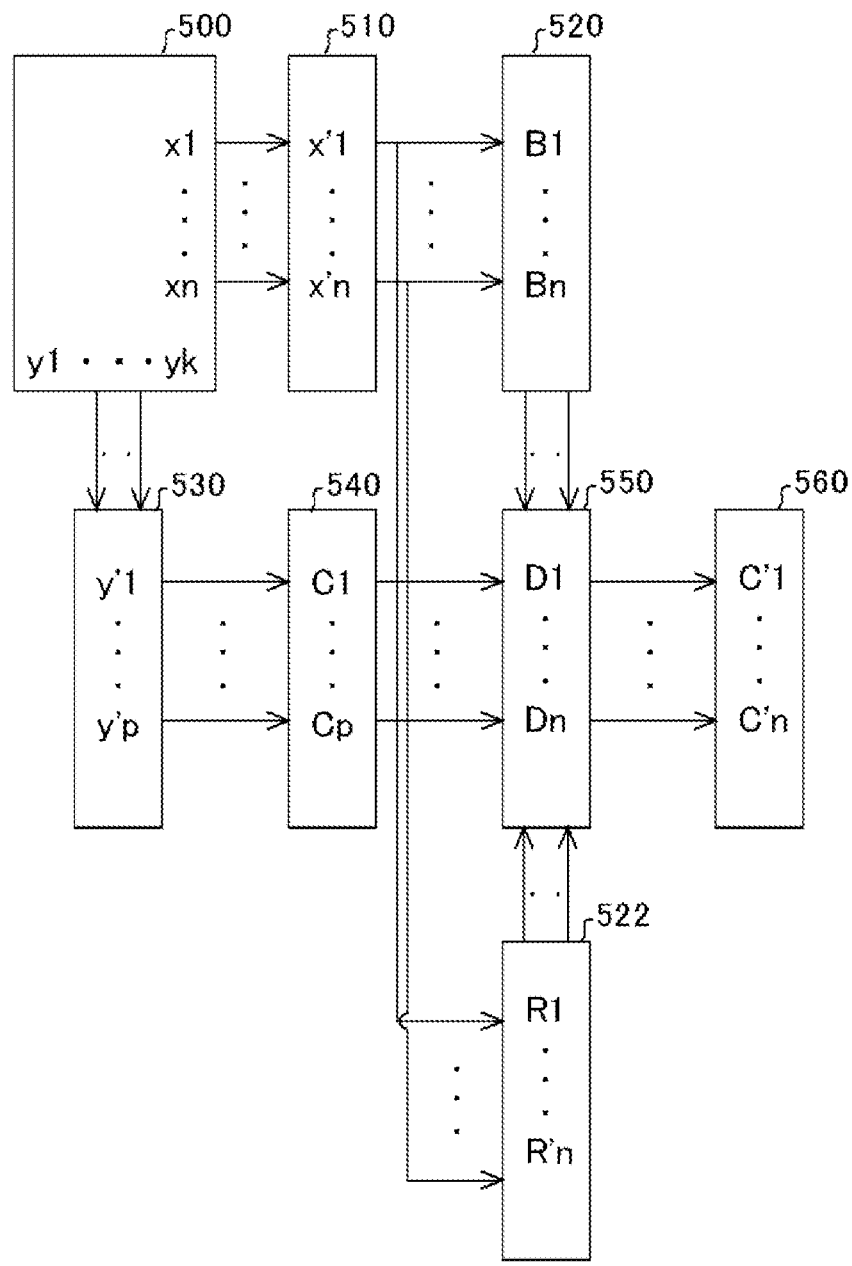
FIG. 5 illustrates one example of a generation flow of a notification plan.

FIG. 5 illustrates one example of a generation flow of the notification plan. The setting unit 220 generates passing point information x (x1 to xn) and switching recommendation point information y (y1 to yk) based on information of the road scheduled to be travelled specified by the travel road specification unit 210 based on a current location and a destination of the movable object 20 (block 500). The setting unit 220 specifies point information x' (x'1 to x'n) associated with the passing point information x (block 510). The notification plan generation unit 240 generates notification data B (B1 to Bn) based on the point information x' (block 520). The notification data B may be notification data generated, for example, from the content data locally managed by the notification server 40 itself. In addition, the notification plan generation unit 240 obtains notification data R and R' (R1 to Rn, R'1 to R'n) based on the point information associated with the passing point information x (block 522). The notification data R may be notification data generated, for example, from content data obtained from the content server 50.

The notification plan generation unit 240 specifies point information y' (y'1 to y'p) associated with the switching recommendation point y (block 530). The notification plan generation unit 240 obtains notification data C (C1 to Cp) based on the point information y' (block 540). The notification data C may be notification data generated from the content data obtained from the content server 50. The notification data C may be notification data generated by the notification server 40. For example, the notification data C may be notification data for notification on the switching of the automated driving level.

The notification plan generation unit 240 generates a set D (D1 to Dn) of the notification data B, the notification data R, and the notification data C (block 550). The notification plan generation unit 240 decides an order of the notification data to be set in the management unit from the set D, and sets the notification data (C'1 to C'q) in the management unit (block 560). In this manner, the notification plan generation unit 240 generates the notification plan.

Figure 6:
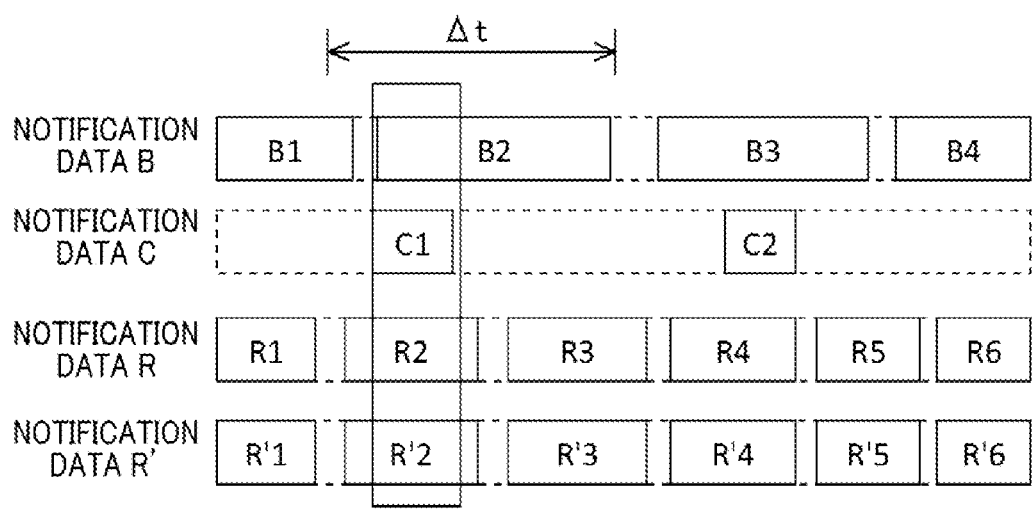
FIG. 6 illustrates another example of the generation flow of the notification plan.

FIG. 6 illustrates another example of the generation flow of the notification plan. The notification data B, the notification data C, the notification data R, and the notification data R' are the notification data generated by a method similar to the method described in association with FIG. 4. The notification plan generation unit 240 arranges the notification data B in accordance with predetermined criteria in a time series manner. Similarly, the notification plan generation unit 240 arranges the notification data C in accordance with predetermined criteria in a time series manner. In addition, the notification plan generation unit 240 arranges the notification data R in accordance with predetermined criteria in a time series manner. In addition, the notification plan generation unit 240 arranges the notification data R' in accordance with predetermined criteria in a time series manner. In a case where the notification data to be presented in a future period Δt is selected, the notification plan generation unit 240 selects and presents one piece of notification data among a plurality of pieces of notification data arranged in Δt. For example, the notification plan generation unit 240 selects one piece of notification data among a plurality of pieces of notification data B2, C1, R2, and W2.

Note that the notification plan generation unit 240 may select one piece of notification data based on priority information associated with with each of the plurality of pieces of notification data. In addition, the notification plan generation unit 240 may select a plurality of pieces of notification data. For example, the notification plan generation unit 240 may select the notification data C1 and the notification data R2 as the notification data to be presents in Δt. In this case, the notification plan generation unit 240 may perform such a setting that the notification data C1 and the notification data R2 are shifted in the period Δt to be presented.

In this manner, the notification plan generation unit 240 may generate the plurality of notification plans including the plurality of pieces of notification data from the current location, the passing location, or the destination of the movable object 20, and select and present the notification data corresponding to the switching recommendation point among the plurality of pieces of notification data included in the plurality of generated notification plans.

Figure 7:
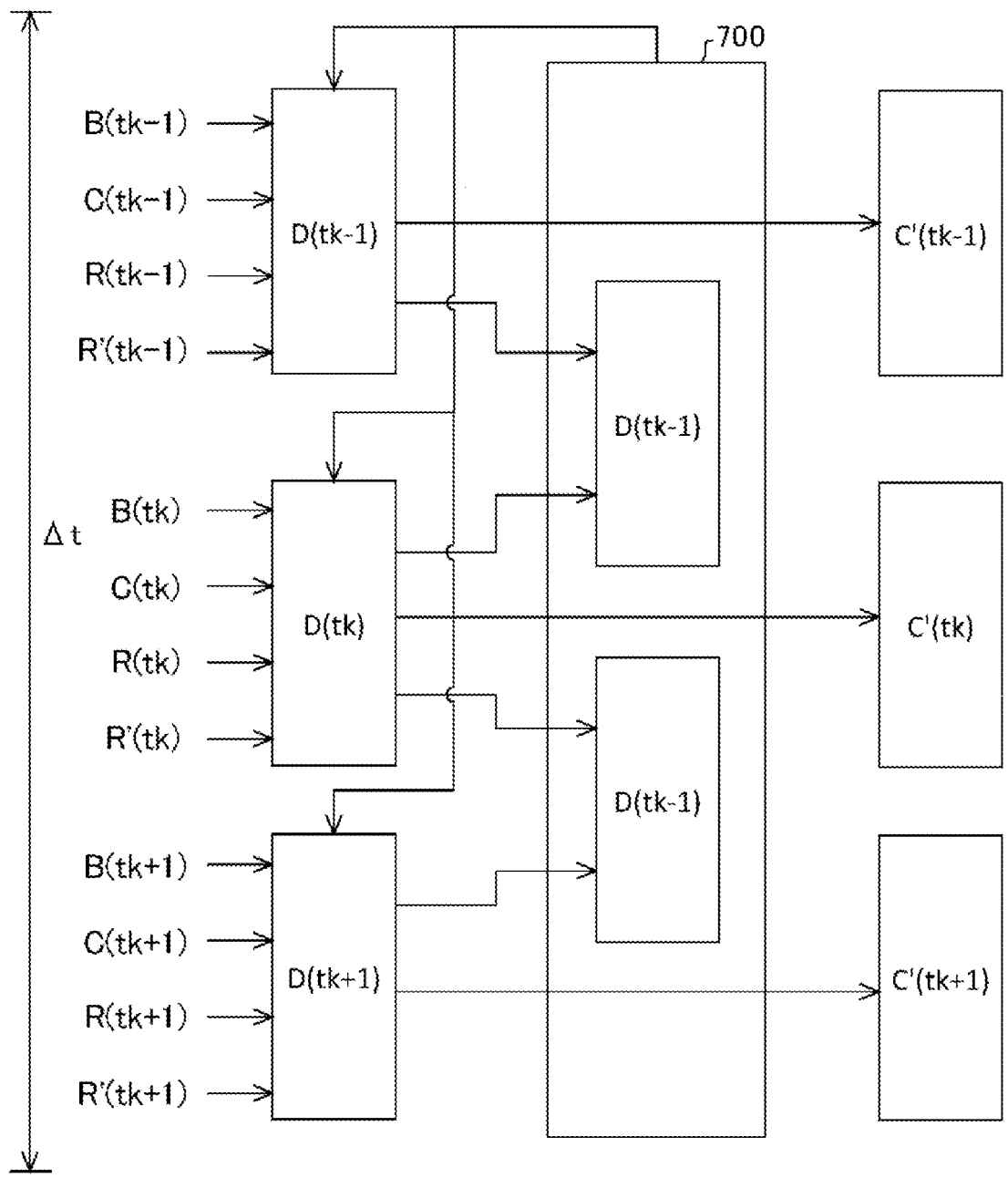
FIG. 7 illustrates another example of the generation flow of the notification plan.

FIG. 7 illustrates another example of the generation flow of the notification plan. The notification data B, the notification data C, the notification data R, and the notification data R' are notification data generated by a method similar to the method described in association with FIG. 4. In addition, in FIG. 7, characters in brackets in each of the notification data B, the notification data C, the notification data R, and the notification data R' represent a time instant. For example, B(tk) denotes the notification data selected as the notification data that may be presented at a time instant tk in accordance with the predetermined criteria.

The notification plan generation unit 240 temporarily selects notification data D (D(tk−1), D(tk), D(tk+1)) that should be presented at each time instant (tk−1, tk, tk+1) in the period Δt. The notification plan generation unit 240 obtains the notification data D in a time series manner to obtain differential information (block 700), and selects the notification data selected as the notification data D such that the differential information satisfies a predetermined condition. For example, in a case where the automated driving level is associated with the notification data, the notification plan generation unit 240 may set a rate of change of the automated driving level per unit time to be below a predetermined value. The association between the notification data and the automated driving level will be described below. In addition, in a case where information intensity of the notification data is associated with the notification data, the notification plan generation unit 240 may set a rate of change of the information intensity per unit time to be equal to or higher than a predetermined value. The information intensity may be associated with the notification data in advance according to the contents presented as the notification data, for example. The notification plan generation unit 240 may set a provided amount of the notification data per unit time which is generated from the advertisement data to be equal to or higher than a predetermined value.

In a case where a combination of the notification data D in which the differential information satisfies a predetermined condition is found, the notification plan generation unit 240 decides the notification data D as the notification data C' to be presented. Note that in a case where the combination of the notification data D satisfying the predetermined condition is not decided, the setting unit 220 may change the automated driving level of the movable object 20 and search for the notification data D again. In addition, in a case where the notification data satisfying the predetermined condition is not decided, the travel road specification unit 210 may change the road scheduled to be travelled by the movable object 20 and search for the notification data D again.

Figure 8:
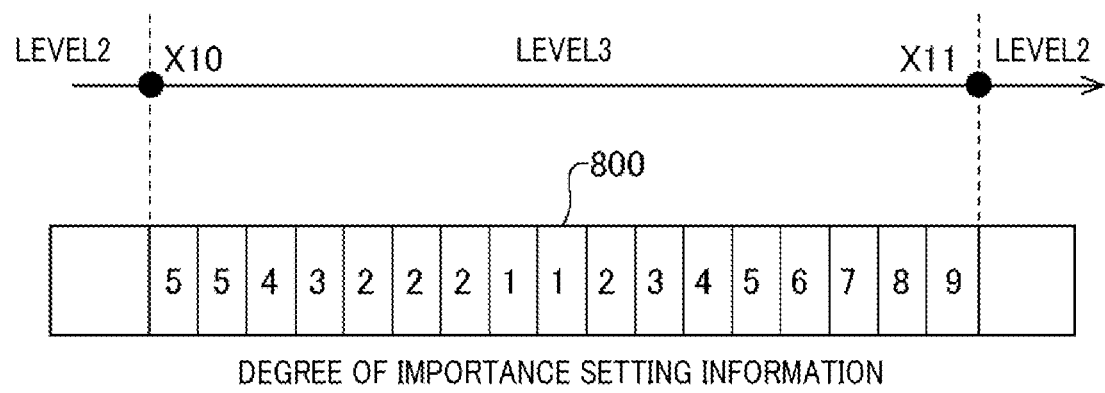
FIG. 8 illustrates one example of setting information to which a notification plan generation unit 240 refers for setting a degree of importance.

FIG. 8 illustrates one example of setting information to which the notification plan generation unit 240 refers for setting a degree of importance. FIG. 8 illustrates the setting information of the degree of importance in a management unit 800 corresponding to the automated driving level 3. In particular, FIG. 8 illustrates the setting information of the degree of importance in a management element between a switching recommendation point X10 for switching from the automated driving level 2 to the automated driving level 3 and a switching recommendation point X11 for switching from the automated driving level 3 to the automated driving level 2. Note that the degree of importance is evaluated in 10 steps from 1 to 10.

As illustrated in FIG. 8, the closer it is to the switching recommendation point X11 where the automated driving level 3 is changed to the automated driving level 2, the higher the degree of importance is set. This is because the closer it is to the point X11, the higher the possibility is that the occupant 80 pays attention, since the point X11 is a point where the automated driving level is lowered. In particular, there is a higher possibility that the occupant 80 is paying deeper attention at the point X11 since the state in which driving control led by the automated drive control apparatus 22 is performed except in the case of emergency is switched to the state in which driving control led by the occupant 80 is performed. In addition, since the point X11 is timing for switching to the driving control led by the occupant 80, the occupant 80 is likely to have an intention to make a new action by themself. Therefore, since the closer it is to the point X11, the higher the possibility that the notification effect of an advertisement or the like is further increased becomes, it is desirable to increase the degree of importance.

The point X10 is a point where the automated driving level 2 is switched to the automated driving level 3. Immediately after the point X10, since the occupant is in a state of being substantially released from the driving, the occupant is likely to pay attention to matters other than driving. Therefore, it can be considered that there are some notification effect of the advertisement or the like. However, this is a state just after the switching to the driving led by the automated drive control apparatus 22, the occupant 80 may not have as much intention to make a new action by themself. Therefore, the degree of importance immediately after the point X10 is decreased as compared with the degree of importance immediately before the point X11. When time elapses in the state at the automated driving level 3, there is a possibility that a relaxed state of the occupant 80 is deepened. Thus, since it can be considered that the notification effect of the advertisement or the like is decreased over the elapse of time, the degree of importance is decreased.

Figure 9:
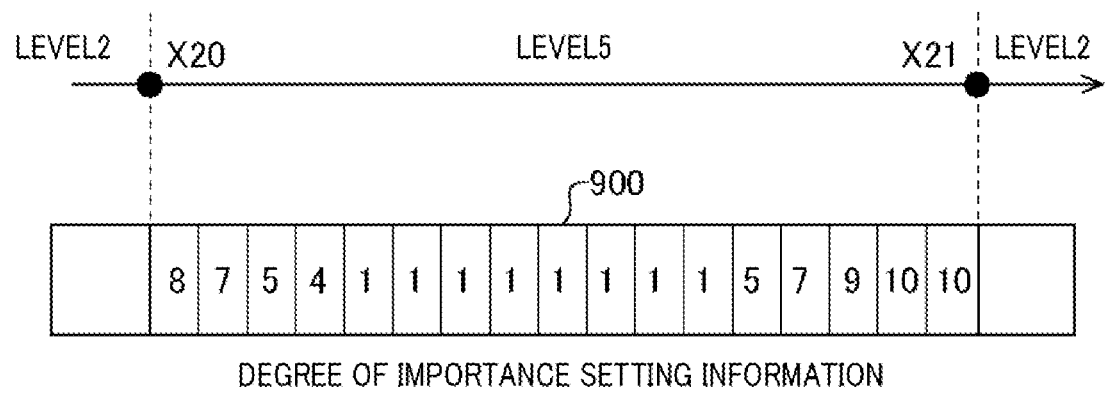
FIG. 9 illustrates another example of the setting information to which the notification plan generation unit 240 refers for setting the degree of importance.

FIG. 9 illustrates another example of the setting information to which the notification plan generation unit 240 refers for setting a degree of importance. FIG. 9 illustrates the setting information of the degree of importance in a management unit 900 corresponding to the automated driving level 5. In particular, FIG. 9 illustrates the setting information of the degree of importance in the management element between a switching recommendation point X20 where the automated driving level 2 is switched to the automated driving level 5 and a switching recommendation point X21 where the automated driving level 5 is switched to the automated driving level 2.

Similarly to FIG. 8, the closer it is to the switching recommendation point X21 where switching from the automated driving level 5 is switched to the automated driving level 2 occurs, the higher the degree of importance is set. In particular, since the point X21 is a point where the automated driving level is lowered from a fully automated driving state to the automated driving level 2, the closer it is to the point X21, the higher the possibility that the occupant 80 pays attention becomes. For this reason, the degree of importance immediately before the point X21 is increased as compared with the degree of importance immediately before the point X11 illustrated in FIG. 8.

The point X20 is a point where switching from the automated driving level 2 to the automated driving level 5 occurs. Immediately after the point X20, since the occupant is in a state of being released from the driving, the occupant is likely to pay attention to matters other than driving. In particular, it can be considered that the higher the automated driving level, the more likely the occupant is to pay attention to matters other than driving. For this reason, the degree of importance immediately after the point X21 is increased as compared with the degree of importance immediately after the point X10 as illustrated in FIG. 8. On the other hand, this is a state in which switching to the fully automated drive has occurred, the occupant 80 may not have as much intention to make a new action themself. Therefore, the degree of importance immediately after the point X20 is decreased as compared with the degree of importance immediately before the point X21. When time elapses in the state at the automated driving level 5, there is a possibility that the relaxed state of the occupant 80 is deepened. Thus, since it can be considered that the notification effect of the advertisement or the like is decreased over the elapse of time, the degree of importance is decreased over the elapse of time. Since it can be considered that the higher the automated driving level, the more likely the occupant 80 is to enter the relaxed state promptly, the decreasing rate of the degree of importance near the point X20 may be set to be higher than the decreasing rate of the degree of importance near the point X10 illustrated in FIG. 8.

Note that the setting information illustrated in FIG. 8 and FIG. 9 is one example of the setting information of the degree of importance. The degree of importance for the automated driving level other than the automated driving levels 3 and 5 may also be set by similar setting information. In addition, the setting information may be created for each combination of the automated driving level before the switching recommendation point and the automated driving level after the switching recommendation point. In addition, the greater the difference between the automated driving levels before and after the switching recommendation point is, the higher the degree of importance before or after the switching recommendation point may be set. In addition, the greater the difference between the automated driving levels in locations before and after the switching recommendation point, the higher the degree of importance before or after the switching recommendation point may be set.

In addition, in FIG. 8 and FIG. 9, the importance information for each notification timing of the notification data in one management unit has been exemplified. However, the importance may be set irrespective of the management unit. In addition, the higher the automated driving level, the higher the degree of importance may be set, irrespective of whether the degree of importance is set for each management unit.

Figure 10:
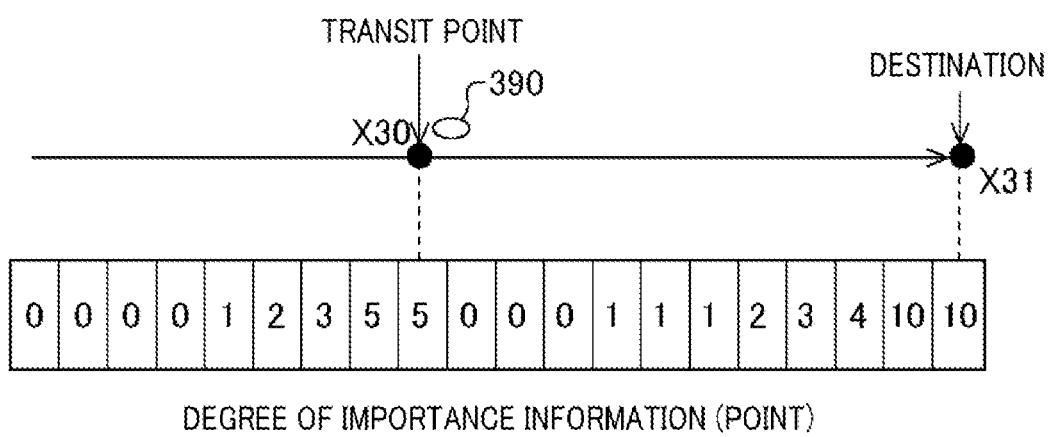
FIG. 10 illustrates another example of the setting information for the setting degree of importance.

FIG. 10 illustrates another example of the setting information for setting the degree of importance. FIG. 10 illustrates one example of the setting information of the degree of importance determined from the point. First, the closer it is to the point X31 corresponding to the destination, the higher the degree of importance is set. This is because it can be considered that the occupant 80 is likely to have strong interest in information related to the destination or the like. The passing point X30 is a point close to a spot 390 such as a tourist spot. The degree of importance is further increased as it becomes closer to the passing point X30 in a travelling direction of the movable object 20, and the degree of importance is more acutely decreased as it becomes farther away from the spot 390 in the travelling direction.

In this manner, the degree of importance is increased ahead of the passing point or ahead of the destination. Note that the notification plan generation unit 240 may set the degree of importance in the management unit using a total value of the degree of importance based on the point and the degree of importance according to the switching recommendation point or the automated driving level. In addition, the passing point may be set for each of the occupants 80. For example, the degree of importance may be further increased for the point where it can be determined that there is a possibility that the occupant 80 has an interest from the interest information of the occupant 80.

FIG. 11 illustrates a data structure of occupant behavior information for evaluating a movement of the occupant 80. The occupant behavior information associates a user ID with behavior information. The user ID is identification information of the occupant 80. The behavior information includes personal-associated advertisement and point-associated advertisement as evaluate elements. The personal-associated advertisement indicates an evaluation value in a case where advertisement based on the personal information is presented. The advertisement based on the personal information may be, for example, previously collected interest information of the occupant 80 or the like. The point-associated advertisement indicates an evaluation value in a case where advertisement based on of the passing point or the destination is presented.

Regarding the personal-associated advertisement, in a case where it is found that the occupant 80 has an interest in fishing, after notification data of an advertisement related to a fishing gear shop is presented, when the occupant 80 visits the fishing gear shop, the evaluation value associated with the identification information of the occupant 80 and the "personal-associated advertisement" is counted up. Regarding the point-associated advertisement, in a case where there is a park near the passing point, and the occupant 80 visits Park A after notification data including a message stating "The cherry blossoms in Park A are at their best now." is presented to the occupant 80, the evaluation value associated with the identification information of the occupant 80 and the point-associated advertisement is counted up.

In a case where the evaluation value associated with passing point-associated advertisement and the identification information of the occupant 80 is higher than a predetermined value, the notification plan generation unit 240 determines that the occupant 80 tends to value the advertisement associated with the passing point, and increases the degree of importance near the passing point. On the other hand, in a case where the evaluation value associated with the personal-associated advertisement and the identification information of the occupant 80 is higher than a predetermined value, it is determined that the occupant 80 tends to value the advertisement associated with the personal information, and the degree of importance near the passing point is not increased.

FIG. 12 illustrates one example of association degree information between the notification data and the automated driving level. The association degree information is information indicating the association degree between a type of the notification data and the automated driving level.

For the "association degree", a value is set between 0 and 10 according to the strength of association. The association degree 10 indicates that the association with the corresponding automated driving level is the highest. The association degree 0 indicates that there is no association with the corresponding automated driving level. The notification data of the type in which the association degree 0 is set indicates that the presentation of this notification data is not permitted at the corresponding automated driving level. The notification data of the type in which the association degree 1 or above is set indicates that the presentation of this notification data is permitted at the corresponding automated driving level. The association degree 0 indicates that the presentation of the notification data is not permitted while the movable object 20 travels at the corresponding automated driving level.

In the type of the notification data, a "road A" represents notification data associated with a change of the automated driving level. For example, the "road A" includes notification data for notification on the change of the automated driving level.

A "road B" represents notification data affecting the automated drive. The "road B" includes notification data for notification on occurrence of an accident or the like.

A "road C" represents notification data associated with a change of the destination. For example, the "road C" includes notification data for notification on occurrence of fire at the destination, notification data for notification on a hazardous weather at the destination, notification data for notification on a possibility of a severe delay of the arrival at the destination, or the like.

As the association degree with the automated driving level, "10" is set in the "road A", the "road B", and the "road C". Therefore, the notification data corresponding to the "road A", the "road B", and the "road C" is presented by priority at all the automated driving levels.

An "advertisement A" represents advertisement data in which it is presumed that the occupant 80 has an interest. The advertisement in which it is presumed that the occupant 80 has the interest may be specified based on the interest information previously collected from the occupant 80, history information of the behavior of the occupant 80, a change of facial expression of the occupant 80 in a case where the notification data of the advertisement data is presented, or the like.

An "advertisement B" represents advertisement data related to a point in proximity to the road scheduled to be travelled. The "advertisement B" includes advertisement data at the point in proximity to the road scheduled to be travelled by the movable object 20. An "advertisement C"

represents advertisement data that does not correspond to any of the "advertisement A" and the "advertisement B". In the "advertisement C", the association degree "0" is set for the automated driving level 2 or below. For this reason, in a case where the automated driving level is 2 or below, the presentation of the notification data corresponding to the "advertisement C" is not permitted.

"News A" represents news data in which it is presumed that the occupant 80 has an interest. Whether this data is news data in which it is presumed that the occupant 80 has the interest may be specified based on the change of the facial expression of the occupant 80 when the news data is presented, or the like.

"News B" represents news data related to a point in proximity to the road scheduled to be travelled. The "news B" includes news data for notification of news occurring at the destination of the movable object 20. In the "news B", the association degree "0" is set for the automated driving level 0. For this reason, in a case where the automated driving level is 0, the presentation of the notification data of the "news B" is not permitted.

"News C" represents news data that does not correspond to any of the "news A" and the "news B". A "small talk" is notification data presented accompanying with a chat such as an SNS, a conversation system, and a conversation. In the "news C" and the "small talk", the association degree "0" is set for the automated driving level equal to or lower than level 2. For this reason, in a case where the automated driving level is 2 or below, the presentation of the notification data of the "news C" and the notification data of the "small talk" is not permitted.

The notification plan generation unit 240 refers to the association degree information, and sets, in the management unit, the notification data associated with the association degree "1" or above for the automated driving level that is set for the road scheduled to be travelled. In this manner, for example, it is possible to reduce the possibility of unnecessary intervention to the occupant 80 which might occur when the notification data related to the "small talk" is presented during the driving at the automated driving level 0. Note that the notification plan generation unit 240 may set the notification data having a higher association degree corresponding to the current driving mode in the management unit in a more preferential manner. In this manner, the appropriate notification data in the current driving mode can be presented.

Figure 13:
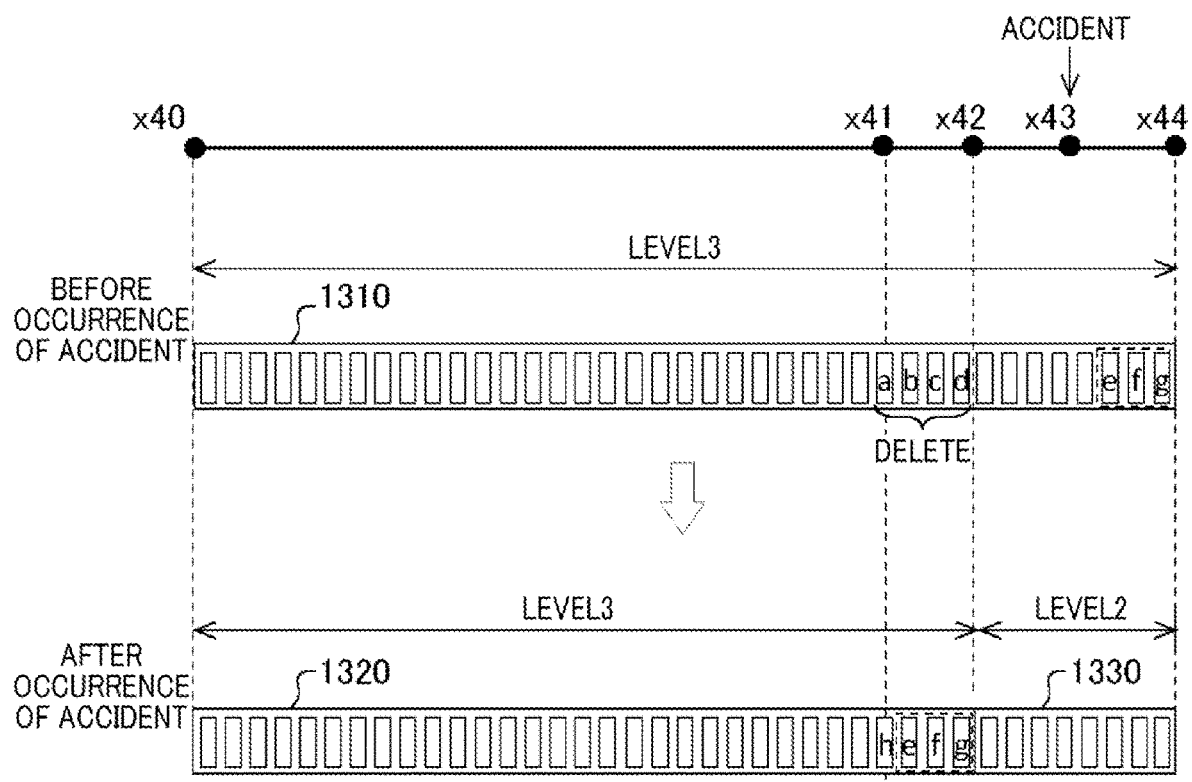
FIG. 13 illustrates one example of an update method of the notification plan.

FIG. 13 illustrates one example of an update method of the notification plan. Examples of a factor for changing the switching recommendation point may include occurrence of an accident on the road scheduled to be travelled by the movable object 20, and the like. In a case where the notification server 40 determines that an accident has occurred on the road scheduled to be travelled by the movable object 20 from traffic information, information collected by another movable object, SNS information, and the like, the notification plan generation unit 240 generates notification data indicating the occurrence of the accident.

In FIG. 13, it is set that the movable object 20 travels at the automated driving level 3 from a point X40 to a point X44. When an accident occurs at a point X43, based on the accident occurrence point X43, the setting unit 220 determines that the automated driving level needs to be lowered to 2 at the accident occurrence point X43. The setting unit 220 sets the automated driving level at 2 in a section between a point X42 to the point X44 including the point X43.

Then, according to the change of the switching recommendation point of the automated driving level, the notification plan generation unit 240 changes a management unit 1310 to a management unit 1320 and a management unit 1330, and also changes the notification plan. Specifically, the notification plan generation unit 240 generates notification data h to be presented at a point X41 at a predetermined distance to the point X42 where the automated driving level is switched before the point X42 is reached. For example, additional notification data h stating "An accident has occurred. The automated driving level is lowered to 2 in ○ km." is generated. The notification data h is notification data related to the change of the automated driving level and is the notification data corresponding to the above-mentioned "road A".

At this time, it is assumed that notification data a corresponding to the point X41 in the notification plan before the occurrence of the accident is the notification data of an advertisement. In this case, the notification plan generation unit 240 generates a notification plan for deleting the notification data a and presenting the notification data h. In addition, the notification plan generation unit 240 deletes three pieces of notification data b to d before the point X42, and also sets three pieces of notification data e to g near the switching recommendation point X44 at locations of the notification data b to d in the notification plan before the occurrence of the accident. The notification data e to g are set as notification data having a higher degree of importance than the notification data a to d. For this reason, in a case where a switching recommendation point X42 is newly set, the notification plan generation unit 240 regenerates a notification plan for presenting the notification data e to g ahead of the switching recommendation point X42.

In this manner, ahead of the point X42 where the automated driving level is switched, the notification data for the advance notification on the switching of the automated driving level can be presented to the occupant 80. In addition, the notification plan can be generated such that the notification data e to g with high degree of importance that was scheduled to be presented ahead of the switching recommendation point X44 in the notification plan before the occurrence of the accident is presented ahead of the new switching recommendation point X42. In addition, the notification plan generation unit 240 can delete the notification data b to d with relatively low degree of importance, and present the notification data e to g with high degree of importance.

As described above, in accordance with the system 10, the degree of importance can be set according to the automated driving level. In addition, the notification data with high degree of importance can be set according to the notification effect to the occupant 80. For example, for the notification on the occurrence of the switching of the automated driving level, the notification is desirably presented at timing with high notification effect to the occupant 80. In accordance with the system 10, the notification data can be automatically assigned using the degree of importance as a parameter. Note that the degree of importance may reflect the price paid by an advertisement data providing company.

The movable object 20 is, for example, transport equipment. The transport equipment includes an automobile such as a passenger car or a bus, a vehicle such as a saddle-type vehicle or a bicycle, a robot, or the like.

Note that the movable object 20 may have at least a part of the functions of the notification server 40 described above. For example, the notification apparatus 24 may have the function of the travel road specification unit 210. The notification apparatus 24 may have the function of the setting unit 220. The notification apparatus 24 may have the function of the notification plan generation unit 240.

Figure 14:
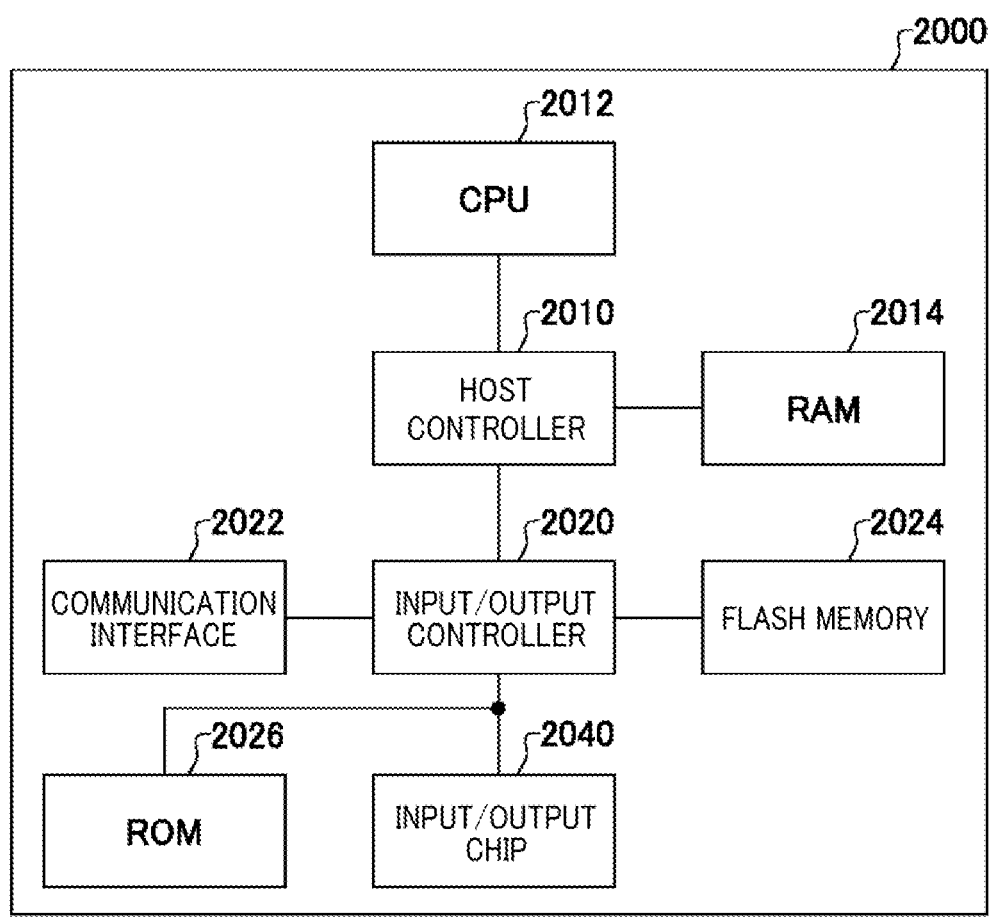
FIG. 14 illustrates an example of a computer 2000.

FIG. 14 illustrates an example of a computer 2000 where a plurality of embodiments of the present invention may be entirely or partially embodied. Programs installed in the computer 2000 can cause the computer 2000 to: function as apparatuses such as the control apparatus 200 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to this embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014 or the ROM 2026, and are executed by the CPU 2012. Information processing written in these programs is read by the computer 2000, and provides cooperation between the programs and the various types of hardware resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of said plurality of entries, an entry with the attribute value of the first attribute specified that meets a condition, read the attribute value of the second attribute stored in said entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program installed in the computer 2000 and causing the computer 2000 to function as the control apparatus 200 may instruct the CPU 2012 or the like to cause the computer 2000 to function as each unit of the control apparatus 200. The information processing written in these programs are read by the computer 2000 to cause the computer to function as each unit of the control apparatus 200, which is specific means realized by the cooperation of software and the various types of hardware resources described above. Then, these specific means implement operations or processing of information corresponding to the intended use of the computer 2000 in this embodiment, so that the control apparatus 200 is constructed as a specific information processing apparatus corresponding to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 system
20 movable object
22 automated drive control apparatus
24 notification apparatus
28 communication apparatus
29 sensor
40 notification server
50 content server
80 occupant
90 network
200 control apparatus
210 travel road specification unit
220 setting unit
240 notification plan generation unit
250 occupant state obtaining unit
270 notification control unit
280 storage device
290 communication apparatus
300 road scheduled to be travelled
310 management unit
330 notification data
390 spot
800 management unit
900 management unit
1310 management unit
1320 management unit
1330 management unit
2000 computer
2010 host controller
2012 CPU
2014 RAM
2020 input/output controller
2022 communication interface
2024 flash memory
2026 ROM
2040 input/output chip

What is claimed is:

1. A control apparatus for controlling advertisement data presented to an occupant of a movable object having an automated driving function, the control apparatus comprising:

At least one processor;
a travel road specification unit configured to specify, using the at least one processor, a road scheduled to be travelled by the movable object corresponding to a destination set for the movable object;
a setting unit configured to set, using the at least one processor, according to the road scheduled to be travelled, a switching recommendation point for switching a driving mode of the movable object from automated drive to driver-led manual drive on the road scheduled to be travelled;
a notification plan generation unit configured to set, using the at least one processor, a degree of importance of the advertisement data that is to be presented according to the driving mode for the road scheduled to be travelled, and generate a notification plan for presenting the advertisement data to the occupant according to the set degree of importance; and
a notification control unit configured to cause, using the at least one processor, notification data including the advertisement data to be presented to the occupant according to the notification plan generated by the notification plan generation unit, wherein the setting unit is configured to set, using the at least one processor, a scheduled passing time instant at which the movable object passes the switching recommendation point, the notification plan generation unit is configured to generate, using the at least one processor, the notification plan for presenting the notification data including the advertisement data to the occupant according to the switching recommendation point and the scheduled passing time instant, and the travel road specification unit is configured to set, using the at least one processor, a passing point on the road scheduled to be travelled corresponding to information of the occupant or a road condition, and set the degree of importance higher in a range up to a location ahead of the passing point by a predetermined distance or up to a location ahead of the destination by a predetermined distance.

2. A control apparatus for controlling advertisement data presented to an occupant of a movable object having an automated driving function, the control apparatus comprising:

at least one processor;

a travel road specification unit configured to specify, using the at least one processor, a road scheduled to be travelled by the movable object corresponding to a destination set for the movable object;

a setting unit configured to set, using the at least one processor, according to the road scheduled to be travelled, a switching recommendation point for switching a driving mode of the movable object from automated drive to driver-led manual drive on the road scheduled to be travelled;

a notification plan generation unit configured to set, using the at least one processor, a degree of importance of the advertisement data that is to be presented according to the driving mode for the road scheduled to be travelled, and generate a notification plan for presenting the advertisement data to the occupant according to the set degree of importance; and a notification control unit configured to cause, using the at least one processor, notification data including the advertisement data to be presented to the occupant according to the notification plan generated by the notification plan generation unit, wherein the automated driving function has a plurality of automated driving modes according to an operation amount of an automated drive control apparatus included in the movable object, the notification plan generation unit is configured to set, using the at least one processor, the degree of importance to be higher for a higher operation amount of the automated drive control apparatus in the automated driving mode, and the travel road specification unit is configured to set, using the at least one processor, a passing point on the road scheduled to be travelled corresponding to information of the occupant or a road condition, and set the degree of importance higher in a range up to a location ahead of the passing point by a predetermined distance or up to a location ahead of the destination by a predetermined distance.

3. A control apparatus for controlling advertisement data presented to an occupant of a movable object having an automated driving function, the control apparatus comprising:

at least one processor;

a travel road specification unit configured to specify, using the at least one processor, a road scheduled to be travelled by the movable object corresponding to a destination set for the movable object;

a setting unit configured to set, using the at least one processor, according to the road scheduled to be travelled, a switching recommendation point for switching a driving mode of the movable object from automated drive to driver-led manual drive on the road scheduled to be travelled;

a notification plan generation unit configured to set, using the at least one processor, a degree of importance of the advertisement data that is to be presented according to the driving mode for the road scheduled to be travelled, and generate a notification plan for presenting the advertisement data to the occupant according to the set degree of importance; and a notification control unit configured to cause, using the at least one processor, notification data including the advertisement data to be presented to the occupant according to the notification plan generated by the notification plan generation unit, wherein the travel road specification unit is configured to set, using the at least one processor, a passing point on the road scheduled to be travelled corresponding to information of the occupant or a road condition, and set the degree of importance higher in a range up to a location ahead of the passing point by a predetermined distance or up to a location ahead of the destination by a predetermined distance, the notification plan generation unit is configured to obtain, using the at least one processor,
 a behavior of the occupant in a case where the advertisement data based on the information of the occupant is presented, and
 a behavior of the occupant in a case where the advertisement data based on the passing point or the destination is presented, and set the degree of importance for each of the occupants using contents of the advertisement data and the behaviors as learning data.

4. The control apparatus according to claim 1, wherein the notification plan generation unit is configured to obtain, using the at least one processor,
 a behavior of the occupant in a case where the advertisement data based on the information of the occupant is presented, and
 a behavior of the occupant in a case where the advertisement data based on the passing point or the destination is presented, and set the degree of importance for each of the occupants using contents of the advertisement data and the behaviors as learning data.

5. The control apparatus according to claim 2, wherein the notification plan generation unit is configured to obtain, using the at least one processor,
 a behavior of the occupant in a case where the advertisement data based on the information of the occupant is presented, and
 a behavior of the occupant in a case where the advertisement data based on the passing point or the destination is presented, and set the degree of importance for each of the occupants using contents of the advertisement data and the behaviors as learning data.

6. The control apparatus according to claim 1, wherein:
the automated driving function has a plurality of automated driving modes according to an operation amount of an automated drive control apparatus included in the movable object;
the notification plan is configured by including the notification data and a plurality of management units in which the notification data is set;
a notification time and at least any driving mode of a corresponding automated driving mode and manual driving mode are set in the notification data;
the plurality of management unit corresponding to the switching recommendation point for switching the driving mode and a scheduled passing time instant at which the movable object passes the switching recommendation point are set in time units;
the notification plan generation unit is configured to set, using the at least one processor, in the management unit, the notification data according to a time of the management unit; and
the notification plan generation unit is configured to set, using the at least one processor, the degree of importance according to timing when the advertisement data is presented in the management unit.

7. The control apparatus according to claim 2, wherein:
the notification plan is configured by including the notification data and a plurality of management units in which the notification data is set;
a notification time and at least any driving mode of a corresponding automated driving mode and manual driving mode are set in the notification data;
the plurality of management unit corresponding to the switching recommendation point for switching the driving mode and a scheduled passing time instant at which the movable object passes the switching recommendation point are set in time units;
the notification plan generation unit is configured to set, using the at least one processor, in the management unit, the notification data according to a time of the management unit; and
the notification plan generation unit is configured to set, using the at least one processor, the degree of importance according to timing when the advertisement data is presented in the management unit.

8. The control apparatus according to claim 3, wherein:
the automated driving function has a plurality of automated driving modes according to an operation amount of an automated drive control apparatus included in the movable object;
the notification plan is configured by including the notification data and a plurality of management units in which the notification data is set;
a notification time and at least any driving mode of a corresponding automated driving mode and manual driving mode are set in the notification data;
the plurality of management unit corresponding to the switching recommendation point for switching the driving mode and a scheduled passing time instant at which the movable object passes the switching recommendation point are set in time units;
the notification plan generation unit is configured to set, using the at least one processor, in the management unit, the notification data according to a time of the management unit; and
the notification plan generation unit is configured to set, using the at least one processor, the degree of importance according to timing when the advertisement data is presented in the management unit.

9. The control apparatus according to claim 4, wherein:
the automated driving function has a plurality of automated driving modes according to an operation amount of an automated drive control apparatus included in the movable object;
the notification plan is configured by including the notification data and a plurality of management units in which the notification data is set;
a notification time and at least any driving mode of a corresponding automated driving mode and manual driving mode are set in the notification data;
the plurality of management unit corresponding to the switching recommendation point for switching the driving mode and a scheduled passing time instant at which the movable object passes the switching recommendation point are set in time units;
the notification plan generation unit is configured to set, using the at least one processor, in the management unit, the notification data according to a time of the management unit; and
the notification plan generation unit is configured to set, using the at least one processor, the degree of importance according to timing when the advertisement data is presented in the management unit.

10. The control apparatus according to claim 5 wherein:
the notification plan is configured by including the notification data and a plurality of management units in which the notification data is set;
a notification time and at least any driving mode of a corresponding automated driving mode and manual driving mode are set in the notification data;
the plurality of management unit corresponding to the switching recommendation point for switching the driving mode and a scheduled passing time instant at which the movable object passes the switching recommendation point are set in time units;
the notification plan generation unit is configured to set, using the at least one processor, in the management unit, the notification data according to a time of the management unit; and
the notification plan generation unit is configured to set, using the at least one processor, the degree of importance according to timing when the advertisement data is presented in the management unit.

11. The control apparatus according to claim 6, wherein:
the setting unit is configured to set, using the at least one processor, the automated driving mode scheduled for each of the roads scheduled to be travelled; and
the notification plan generation unit is configured to set, using the at least one processor, the notification data permitted according to the automated driving mode set for the road scheduled to be travelled in the management unit.

12. The control apparatus according to claim 7, wherein:
the setting unit is configured to set, using the at least one processor, the automated driving mode scheduled for each of the roads scheduled to be travelled; and
the notification plan generation unit is configured to set, using the at least one processor, the notification data permitted according to the automated driving mode set for the road scheduled to be travelled in the management unit.

13. The control apparatus according to claim 1, wherein the degree of importance is a price related to notification of the advertisement data.

14. The control apparatus according to claim 8, wherein:
the setting unit is configured to set, using the at least one processor, the automated driving mode scheduled for each of the roads scheduled to be travelled; and
the notification plan generation unit is configured to set, using the at least one processor, the notification data permitted according to the automated driving mode set for the road scheduled to be travelled in the management unit.

15. The control apparatus according to claim 9, wherein:
the setting unit is configured to set, using the at least one processor, the automated driving mode scheduled for each of the roads scheduled to be travelled; and
the notification plan generation unit is configured to set, using the at least one processor, the notification data permitted according to the automated driving mode set for the road scheduled to be travelled in the management unit.

16. The control apparatus according to claim 10, wherein:
the setting unit is configured to set, using the at least one processor, the automated driving mode scheduled for each of the roads scheduled to be travelled; and
the notification plan generation unit is configured to set, using the at least one processor, the notification data permitted according to the automated driving mode set for the road scheduled to be travelled in the management unit.

17. The control apparatus according to claim 2, wherein the degree of importance is a price related to notification of the advertisement data.

18. The control apparatus according to claim 3, wherein the degree of importance is a price related to notification of the advertisement data.

19. The control apparatus according to claim 4, wherein the degree of importance is a price related to notification of the advertisement data.

20. The control apparatus according to claim 5, wherein the degree of importance is a price related to notification of the advertisement data.

* * * * *